US009615009B1

(12) United States Patent
Buchheit et al.

(10) Patent No.: US 9,615,009 B1
(45) Date of Patent: Apr. 4, 2017

(54) DYNAMICALLY ADJUSTING A LIGHT SOURCE WITHIN A REAL WORLD SCENE VIA A LIGHT MAP VISUALIZATION MANIPULATION

(71) Applicants: Brian K. Buchheit, Hollywood, FL (US); Satesh Ramcharitar, Davie, FL (US)

(72) Inventors: Brian K. Buchheit, Hollywood, FL (US); Satesh Ramcharitar, Davie, FL (US)

( * ) Notice: Subject to any disclaimer, the term of this patent is extended or adjusted under 35 U.S.C. 154(b) by 32 days.

(21) Appl. No.: 14/632,031

(22) Filed: Feb. 26, 2015

(51) Int. Cl.
*H04N 5/232* (2006.01)
*H04N 5/225* (2006.01)

(52) U.S. Cl.
CPC ....... *H04N 5/2256* (2013.01); *H04N 5/23216* (2013.01); *H04N 5/23293* (2013.01)

(58) Field of Classification Search
CPC ....... G01J 1/4214; G06T 5/50; H04N 5/2256; H04N 5/23229; H05N 6/2354
See application file for complete search history.

(56) References Cited

U.S. PATENT DOCUMENTS

| | | | | |
|---|---|---|---|---|
| 6,037,976 A * | 3/2000 | Wixson | .............. | G06K 9/00785 348/122 |
| 6,339,429 B1 * | 1/2002 | Schug | .............. | G09G 5/00 345/589 |
| 6,868,190 B1 * | 3/2005 | Morton | .............. | G06T 5/00 348/208.13 |
| 7,002,623 B1 * | 2/2006 | Ohyama | .............. | H04N 1/6088 348/142 |
| 7,480,083 B2 * | 1/2009 | Takahashi | .............. | H04N 1/6027 348/234 |
| 7,916,129 B2 * | 3/2011 | Lin | .............. | G02B 27/0093 345/156 |
| 8,964,089 B2 * | 2/2015 | Imai | .............. | G06T 5/50 348/220.1 |
| 9,001,226 B1 * | 4/2015 | Ng | .............. | H04N 5/23203 348/211.11 |
| 2009/0010494 A1 * | 1/2009 | Bechtel | .............. | B60Q 1/1423 382/104 |
| 2012/0116632 A1 * | 5/2012 | Bechtel | .............. | B60Q 1/1423 701/36 |
| 2012/0218395 A1 * | 8/2012 | Andersen | .............. | G06F 3/017 348/77 |
| 2013/0120636 A1 * | 5/2013 | Baer | .............. | G03B 15/05 348/335 |
| 2013/0208091 A1 * | 8/2013 | Yahav | .............. | H04N 7/18 348/46 |

(Continued)

*Primary Examiner* — Amy Hsu
(74) *Attorney, Agent, or Firm* — Patents on Demand P.A.; Brian K. Buchheit; Scott M. Garrett

(57) ABSTRACT

A light source within a real world scene can be identified. The light source can be associated with a one or more attributes. The light source can emit light to illuminate the real world scene. The attributes can include intensity, wavelength, and/or orientation. A live view of the real world scene can be presented within an interface of a computing device. The attributes associated with the light source can be determined. A light map for the light source within the real world scene can be computed. The light map can be a graphical visualization of an approximation of a propagation of light emanating from the light source within the scene.

21 Claims, 6 Drawing Sheets

(56) References Cited

U.S. PATENT DOCUMENTS

2015/0077826 A1* 3/2015 Beckman ............... G02B 27/01
                                                    359/238
2015/0172547 A1* 6/2015 Wang ................. H04N 5/23267
                                                  348/208.4

* cited by examiner

DYNAMICALLY ADJUSTING A LIGHT SOURCE WITHIN A REAL WORLD SCENE VIA A LIGHT MAP VISUALIZATION MANIPULATION

CROSS-REFERENCE TO RELATED APPLICATION

This application claims priority to the provisional application entitled "DYNAMICALLY ADJUSTING LIGHT SOURCE WITHIN A REAL WORLD SCENE VIA A LIGHT MAP INTERACTION" filed Feb. 26, 2014 with Application No. 61/944,716, which is incorporated herein in its entirety.

BACKGROUND

The present invention relates to the field of photographic visualization, more particularly, to dynamically adjusting a light source within a real world scene via a light map visualization manipulation.

Photography and film making rely heavily on lights to illuminate a scene to set the mood and even tell a story with a single frame. For example, using a directional light in the background and filling the foreground with soft diffuse lighting can make an actor look sinister without requiring dialog. These lights often include hot lights and strobes which are powerful light sources which can illuminate a room. Additional equipment such as barndoors, filters, diffusers, and gels allow an infinite combination of lighting schemes. Often lighting a scene correctly requires specialized knowledge and experience which many amateur photography and filmmakers lack. As such, a mechanism for improving scene lighting organization and/or planning is necessary.

DETAILED DESCRIPTION

Figure 1:
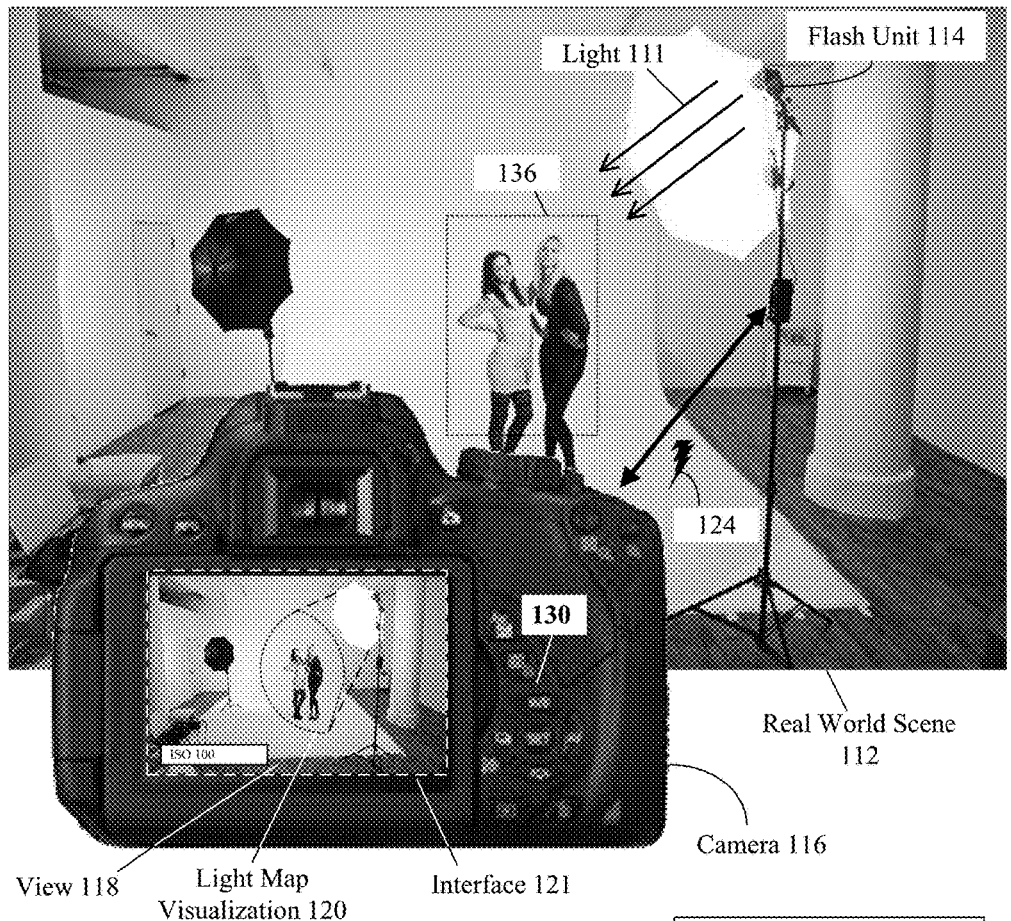
FIG. 1 is a schematic diagram illustrating a scenario for dynamically adjusting a light source within a real world scene via a light map visualization manipulation in accordance with an embodiment of the inventive arrangements disclosed herein.

The present disclosure is a solution for dynamically adjusting a light source within a real world scene via a light map visualization manipulation. In the solution, a light source within a view real world scene can be identified. The view can be presented within an interface of a computing device. In one embodiment, one or more attributes of the light source can be manually and/or automatically identified. In the embodiment, the attributes can be utilized to compute a light field of the light source within the real world scene. In one instance, the light field can be graphically represented as a light map visualization within the interface. In the instance, the visualization can indicate the illumination the light source contributes to the scene. In one configuration of the instance, the visualization can be dynamically manipulated to adjust the light source intensity, color, spread, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 110 for dynamically adjusting a light source within a real world scene via a light map visualization manipulation in accordance with an embodiment of the inventive arrangements disclosed herein. Scenario 110 can be present in the context of scenario 210, 310, 410, method 500, and/or system 600. In scenario 110, a camera 116 can capture a create a light map visualization 120 of light 111 within a view of a real world scene 112.

As used herein, a light map visualization 120 can be a graphical representation of a light field (e.g., of light 111) associated with the propagation of light 111 emitted form a light source (e.g., flash unit 114). In one embodiment, visualization can be associated with a light field data set (e.g., light map) which can represent a light source emitting light 111 within a real world scene. In one instance, visualization 120 can be a bounded area within a view 118 which can indicate the illumination (e.g., light 111) from a light source. That is, visualization 120 can be associated with a real world light source (e.g., flash unit 114).

In scenario 110, a flash unit 114 can be communicatively linked to a camera 116. Unit 114 can be a light source utilized to illuminate a real world scene 112 which can include one or more subjects 136 (e.g., models), a background, and the like. In one instance, camera 116 can present within a interface 121 a live view 118 of scene 112 permitting a user to view scene 112 through interface 121. In the instance, camera 116 can trigger flash unit 114 to emit light 111.

In one embodiment, camera 116 can capture an image of real world scene 112 in which flash unit 114 illuminates the scene 112. In the embodiment, the camera 116 can present the image and a light map visualization which can be overlaid on the area in the image for which the flash unit illuminated. That is, the camera 116 can visually show an area of light propagation associated with the flash illumination and associated boundaries (e.g., where the flash unit is not able to illuminate sufficient). For example, visualization 120 can appear as a highlighted region of view 118 within camera 116 interface to indicate light fall off (e.g., where light 111 is approximately equal to ambient light of scene 112).

In one instance, the visualization 120 can be computed utilizing one or more flash settings 124, camera settings 126, scene 112 information (e.g., ambient light) and the like. In the instance, an ambient light level can be determined prior to unit 114 activation and after light 111 is emitted, the difference can be determined to produce visualization 120. It should be appreciated that visualization 120 generation can be arbitrarily complex and is not limited to the embodiments presented herein.

In one embodiment, visualization 120 can be generated without image capture. In the embodiment, camera 114 can trigger flash unit 114 activation (e.g., test fire, pre-flash) which can be measured by light sensors within camera 114. That is, light sensor (e.g., and associated exposure functionality) within camera can be utilized to produce an approximate visualization of light 111.

It should be appreciated that light 111 propagation can follow an inverse-square distribution and one or more user thresholds can be established to limit the boundaries for which visualization can be computed. That is, an intensity threshold for light 111 can be determined to ensure visualization can include a computationally feasible bounded region. For example, when light 111 in scene 112 is less than 30 lumens (e.g., edges of infinity wall), a boundary can be established for the visualization.

In one embodiment, visualization 120 can include, but is not limited to, a light source identifier, an intensity value, a duration value, an orientation, a color value, a depth value, and the like.

Light sources can include, but is not limited to, flash units, modeling lights, hot lights (e.g., modeling lights), light fixtures, and the like. That is, any light source able to emit light can be modeled (e.g., utilizing traditional and/or proprietary methods) and displayed within an interface of a computing device.

In one embodiment, the disclosure can permit one or more interactions 130 with light map visualization 120. In the embodiment, interactions 130 can be utilized to dynamically adjust light source (e.g., unit 114). That is, by directly manipulating a graphical visualization of the propagation of light 111 from the light source (e.g., 114), light source can be adjusted (e.g., power output, duration, zoom). It should be appreciated that light source adjustment via visualization manipulation can be arbitrarily complex. In one instance, flash unit 114 can be dynamically adjusted through touch buttons on camera 116. In the instance, adjustment of light source can trigger visualization to be appropriate rendered (e.g., updated) to match the adjustment performed. For example, a zoom-in push button can increase the power output of flash 114 by one stop of light when pressed and a zoom-out button can decrease the power output of flash 114 by one stop of light.

Drawings presented herein are for illustrative purposes only and should not be construed to limit the invention in any regard. In one embodiment, camera settings 126 can be utilized to compute light map visualization based on exposure of scene 112 in camera 116 image sensor. Camera settings 126 can include, but is not limited to, orientation, aperture, shutter speed, ISO, and the like. It should be appreciated that interaction 130 can be performed via physical buttons on camera 116, interface elements within camera display, via voice commands, gestures, multi-touch gestures, and the like. It should be appreciated that the disclosure can be used to compute light propagation, light diffusion, light reflection, light refraction, and the like for real world light source illuminating a view of a real world scene.

Figure 2:
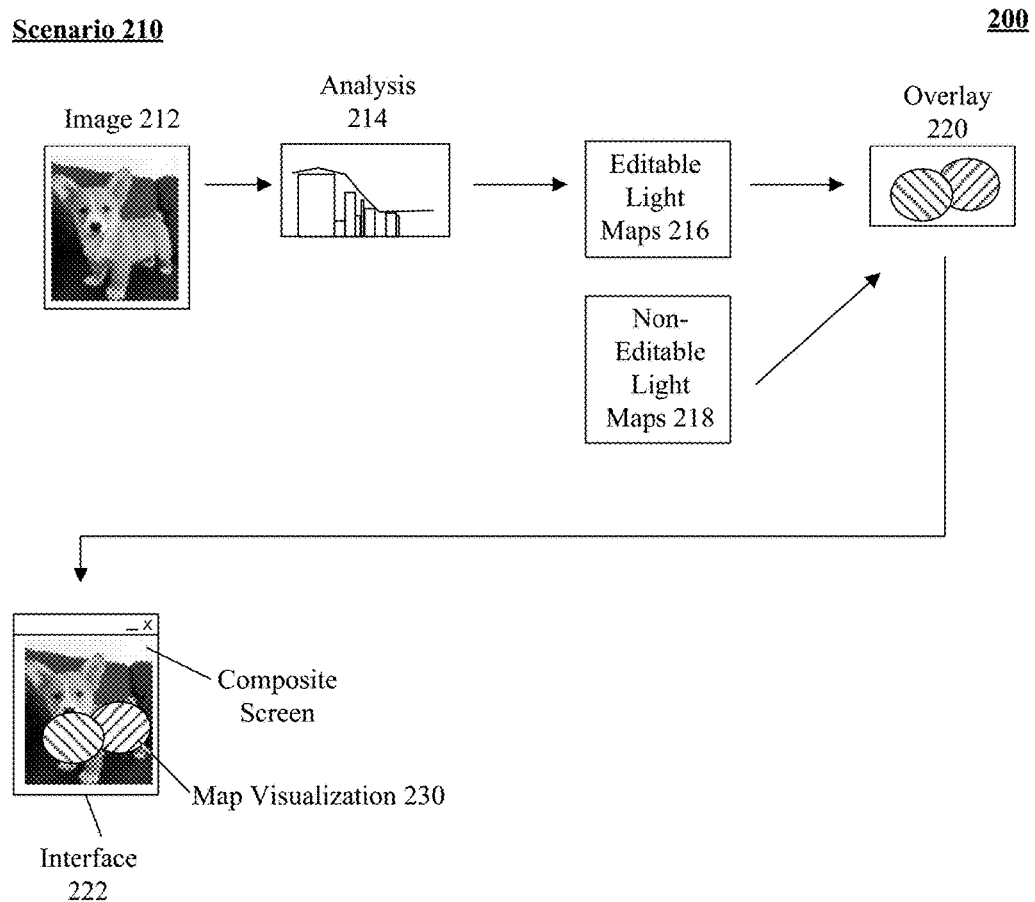
FIG. 2 is a schematic diagram illustrating a scenario for dynamically adjusting a light source within a real world scene via a light map visualization manipulation in accordance with an embodiment of the inventive arrangements disclosed herein.

FIG. 2 is a schematic diagram illustrating a scenario 210 for dynamically adjusting a light source within a real world scene via a light map visualization manipulation in accordance with an embodiment of the inventive arrangements disclosed herein. Scenario 210 can be present in the context of scenario 110, 310, 410, method 500 and/or system 600. In scenario 210, the disclosure can analyze an image 212 to determine one or more light maps associated with the image.

In scenario 210, the disclosure can perform an analysis 214 to identify one or more light maps associated with an image 212. In one instance, analysis can determine one or more editable 216 and/or non-editable light maps 218 associated with lighting within the image. In the instance, an editable light map 216 can be a light map associated with a light source which can be adjusted. In the instance, a non-editable light map 218 can be a light map associated with a light source which cannot be adjusted (e.g., ambient light sources, non-dimmable light bulbs). Analysis 214 can include, but is not limited to, depth analysis, surface geometry determination, histogram information, and the like.

In one instance, a transparent shaded overlay 220 (e.g., visualization) can be generated from each light source. In one embodiment, overlay 220 can be presented upon image 212 within an interface 222 of a computing device as a composite screen to indicate light propagation within the image 212. It should be appreciated that overlay 220 can be generated for each light map 216, 218.

Drawings presented herein are for illustrative purposes only and should not be construed to limit the invention in any regard. In one embodiment, metadata within image 212 can be utilized to generate maps 216, 218 and/or enhance map 216, 218 accuracy. In the embodiment, metadata can include, but is not limited to, exposure data, color space settings, and the like. For example, the disclosure can leverage Exchangeable Image File Format (EXIF) data to compute light map 216, 218 and/or visualization 230.

Figure 3:
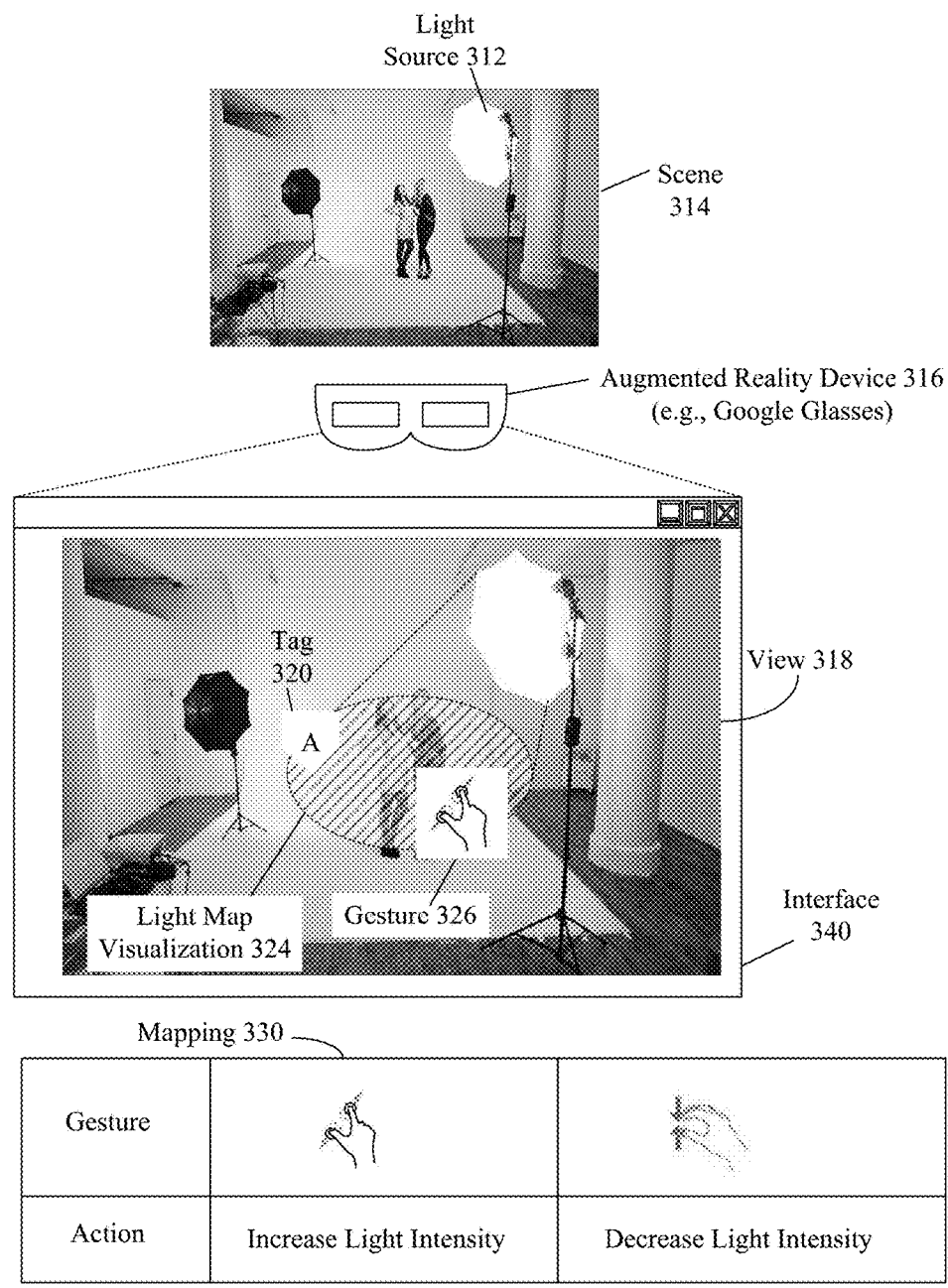
FIG. 3 is a schematic diagram illustrating a scenario for dynamically adjusting a light source within a real world scene via a light map visualization manipulation in accordance with an embodiment of the inventive arrangements disclosed herein.

FIG. 3 is a schematic diagram illustrating a scenario 310 for dynamically adjusting a light source within a real world scene via a light map visualization manipulation in accordance with an embodiment of the inventive arrangements disclosed herein. Scenario 310 can be present in the context of scenario 110, 210, 410, method 500 and/or system 600. In scenario 310, an augmented reality capable device can be utilized to visualize real world light propagation within a real world scene 314.

In scenario 310, a light source 312 can be utilized to illuminate a real world scene 314. A view 318 of scene 314 can be presented within an augmented reality device 316 device. For example, device 316 can be a GOOGLE GLASSES able to show a light map visualization for a light source 312 within the display (e.g., interface 340). In one instance, device 316 can permit visualization 324 to be overlayed onto view 318 indicating a volume of light emitted from light source 312. In one embodiment, visualization 324 can be used to indicate change in light (e.g., diffusion) as a result of objects which can alter light source 312 properties, including, but not limited to, light diffusers (e.g., umbrellas, softboxes), light magnifiers, and the like.

In one instance, the disclosure can generate a modifyable light map visualization 324 for light source 312 which can be presented within view 318. In the instance, visualization 324 can include traditional and/or proprietary attributes/properties including, but not limited to, tag 320 (e.g., name attributes, identifiers), shape (e.g., dimensions, geometry), editing handles (e.g., move/resize handles), and the like. For example, visualization 324 can be associated with resizing handles which allow visualization 324 to be resized similar to vector drawings. In one embodiment, a gesture 326 can be utilized to increase the light intensity from light source 312 when visualization 324 is selected. In the embodiment, a mapping 330 can be utilized to associate gestures and/or interactions with light source 312 command changes. For example, when a pinch apart gesture is used on visualization 324, the light source 312 settings can be increased from ¼ power to ½ power. Mapping 330 can include, but is not limited to, an input, an action, a timing criteria, a constraint (e.g., discrete increments), and the like. For example, mapping 330 can be utilized to limit the amount a light source can be increased via the visualization manipulation. In one embodiment, one or more interface notifications can be presented responsive to interaction with visualization 324. In the embodiment, notifications can indicate modification type (e.g., increase, decrease), modification quantity (e.g., 10%, −2 stops), and the like.

In one instance, tag 320 can correspond to flash command unit names, groups, and the like. For example, visualization 324 can include a flash unit identifier (e.g., Group A, Flash 1) which can be presented within tag 320 of interface 340. It should be appreciated that multiple visualizations 324 can be presented within view 318 which can include overlapping regions. In one instance, overlapping regions of light visualization 324 can be computed utilizing traditional lighting models. That is, the disclosure can enable complex lighting of a scene 314 to be directly visible without requiring the light source 312 to be active and/or present.

In one embodiment, a light map visualization can be created within an interface of device 316 which can alter view 318 allowing virtual lighting of view 318. In the embodiment, the light map visualization can be associated with a real world light source 312 after creation or can remain independent (e.g., truly virtual light source).

Drawings presented herein are for illustrative purposes only and should not be construed to limit the invention in any regard. It should be appreciated that device 316 can include any computing device including, but not limited to, a mobile phone, a tablet computing device, a netbook, a hybrid laptop device, a camera, a remote projection computing system, a 3D glasses, a portable media player, and the like.

Figure 4:
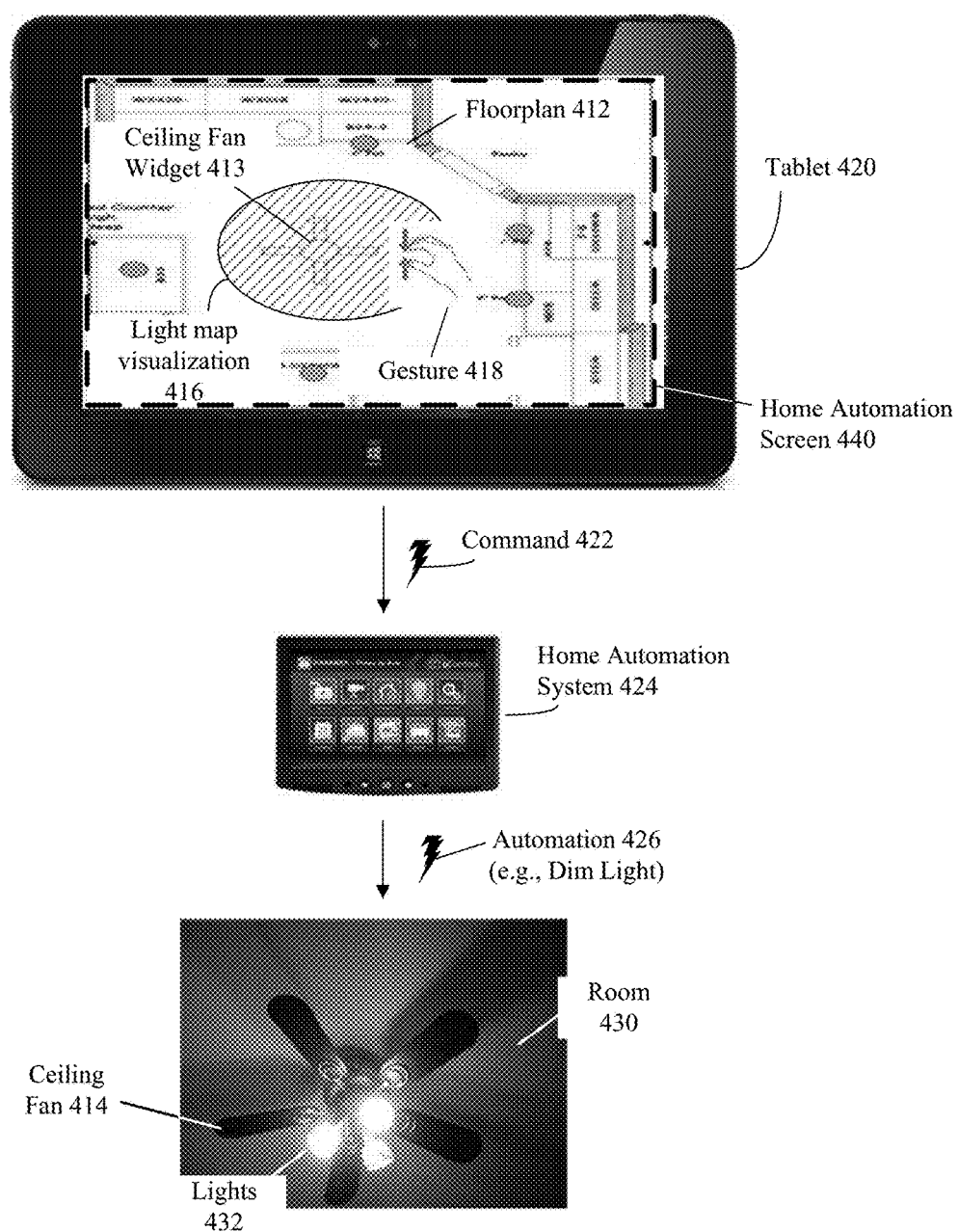
FIG. 4 is a schematic diagram illustrating a scenario for dynamically adjusting a light source within a real world scene via a light map visualization manipulation in accordance with an embodiment of the inventive arrangements disclosed herein.

FIG. 4 is a schematic diagram illustrating a scenario 410 for dynamically adjusting a light source within a real world scene via a light map visualization manipulation in accordance with an embodiment of the inventive arrangements disclosed herein. Scenario 410 can be present in the context of scenario 110, 210, 310, method 500 and/or system 600. In scenario 410, a light map visualization 416 can be a graphical user interface element which can permit manipulation of a real world light source 432 In the scenario, visualization 416 can be utilized to dim lights 432 of a ceiling fan from a home automation screen 440 within tablet 420.

In scenario 410, a tablet 420 device can present a light map visualization 416 associated with a set of lights 432 of ceiling fan 414 in a room 430 of a house. In the scenario, a home automation screen 440 can be utilized to control ceiling fan 414 via a ceiling fan widget 413 (e.g., interactive icon). The screen 440 can present widget 413 within a floorplan 412 layout of a house. For example, floorplan 412 can be a screen of a home automation application executing on tablet 420 or on a HDTV. It should be appreciated that floorplan 412 can include one or more lighting elements, appliances, and the like which can be interacted with via home automation system 424 (e.g., widget 413).

In one embodiment, a visualization 416 of fan 414 can be presented (e.g., overlaid on widget 413) which can approximately portray the lighting conditions of room 430. In one instance, gesture 418 can be utilized to dim the lights 432 by adjusting the size of visualization 416. For example, a pinch squeeze gesture can be utilized to decrease the area of the visualization 416 which can communicate a command 422 to home automation system 424 which can perform an automation 426 resulting in lights 423 dimming ten percent of the current state.

It should be appreciated that visualization 416 can be 2D objects, 3D objects, and the like. Light map visualization 416 can be adjusted in one, two and/or three dimensions (e.g., size of area illuminated, distance illuminated) based on interface presentation of the visualization.

Drawings presented herein are for illustrative purposes only and should not be construed to limit the invention in any regard. It should be appreciated that the functionality described herein can be performed within the home automation system (e.g., control panel) and is not limited to communicatively linked devices.

Figure 5:
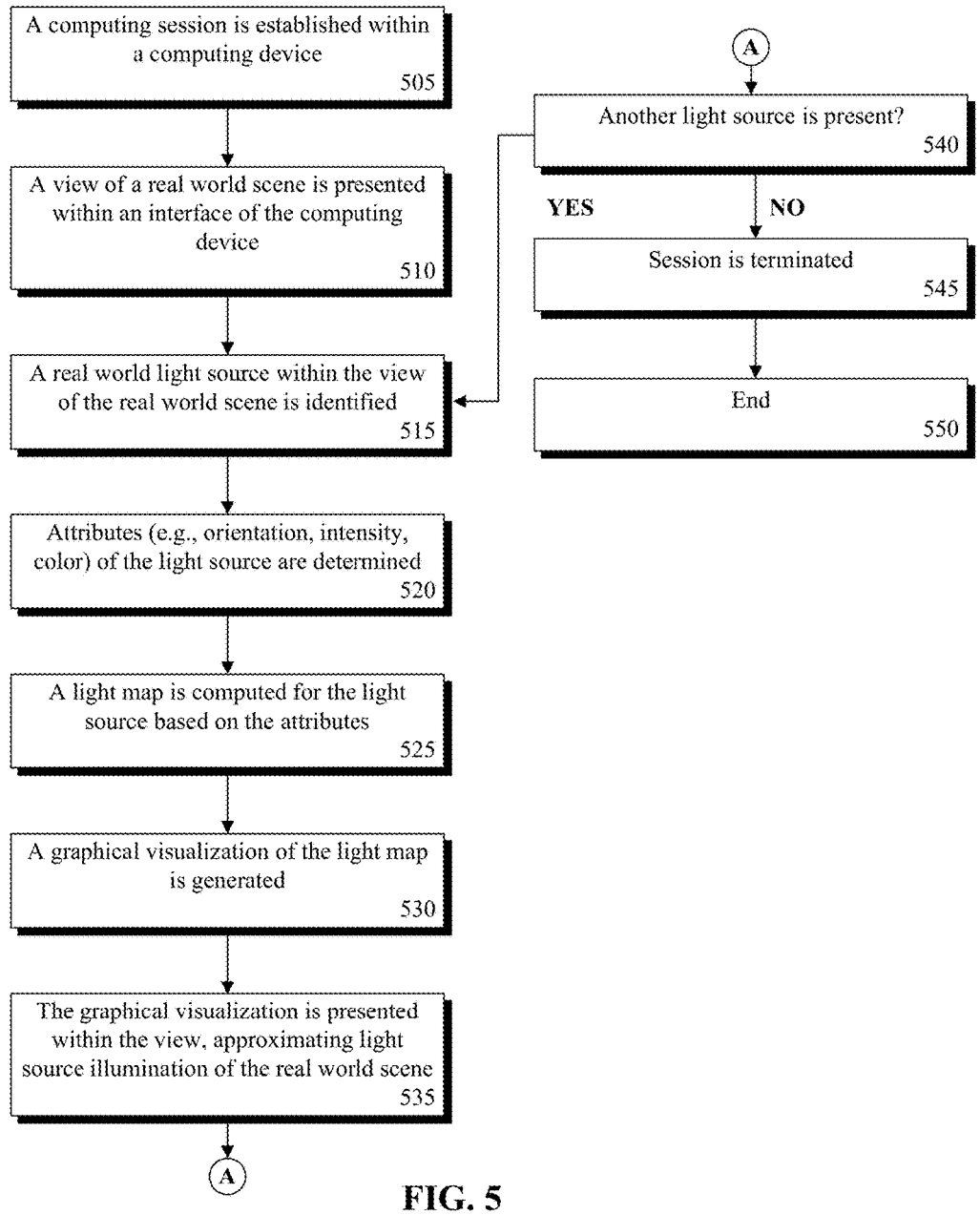
FIG. 5 is a flowchart illustrating a method 500 for dynamically adjusting a light source within a real world scene via a light map visualization manipulation in accordance with an embodiment of the inventive arrangements disclosed herein.

FIG. 5 is a flowchart illustrating a method 500 for dynamically adjusting a light source within a real world scene via a light map visualization manipulation in accordance with an embodiment of the inventive arrangements disclosed herein. Method 500 can be performed within the context of scenario 110, 210, 310, 410, and/or system 600. In method 500, a computing device can be utilized to produce a light map visualization of a real world light source within an interface of the computing device.

In step 505, a computing session can be established within a computing device. In step 510, a view of a real world scene can be presented within an interface of a computing device. In step 515, a real world light source within the view of the real world scene can be identified. In step 520, attributes of the light source can be determined. In step 525, a light map can be computed for the light source based on the attributes. In step 530, a graphical visualization of the light map can be generated. In step 535, the graphical visualization can be presented within the view, approximating light source illumination of the real world scene. In step 540, if another light source is present, the method can return to step 515, else proceed to step 545. In step 545, the session can be terminated. In step 550, the method can end.

Drawings presented herein are for illustrative purposes only and should not be construed to limit the invention in any regard. It should be appreciated that method 500 can be performed in real-time or near real-time. It should be appreciated that steps 515-540 can be performed continuously during computing device usage. It should be understood that method 500 can include one or more additional steps or can lack one or more steps 505-550.

Figure 6:
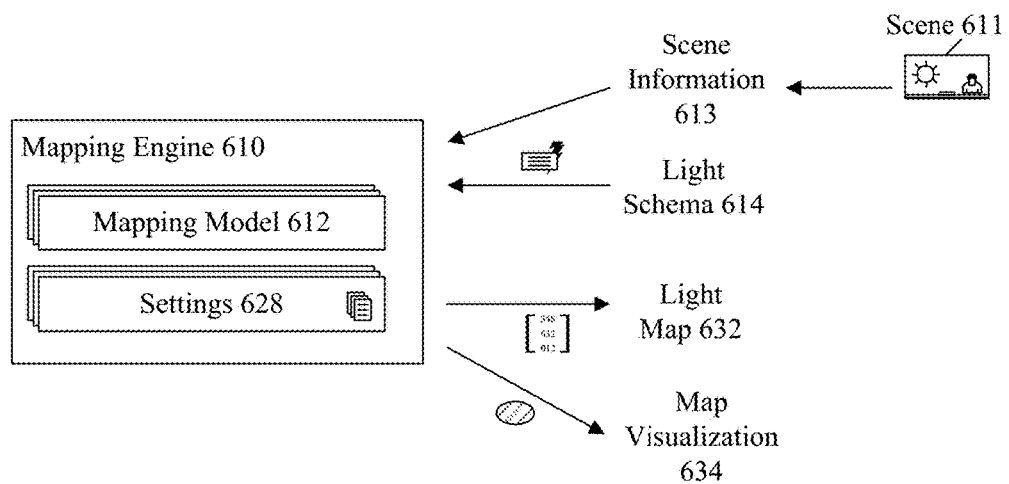
FIG. 6 is a schematic diagram illustrating a system 600 for dynamically adjusting a light source within a real world scene via a light map visualization manipulation in accordance with an embodiment of the inventive arrangements disclosed herein.

FIG. 6 is a schematic diagram illustrating a system 600 for dynamically adjusting a light source within a real world scene via a light map visualization manipulation in accordance with an embodiment of the inventive arrangements disclosed herein. System 600 can be performed in the context of scenario 110, 210, 310, 410, and/or method 500. In system 600, a mapping engine 610 can produce a dynamic light map 632 and/or light map visualization 634 for a scene 611. In one embodiment, engine 610 can generate a dynamic light map visualization for a dynamic light source within scene 611. Dynamic light sources can include, but is not limited to, strobes, light projectors, and the like.

Mapping engine 610 can be a hardware/software entity for generating a light map 632 and/or map visualization 634 from a scene 611 with an associated light schema 614. Engine 610 can include, but is not limited to, mapping model 612, settings 628, and the like. Engine 610 functionality can include, but is not limited to, light schema 614 determination, scene information 613 extraction (e.g., from scene 611), light map 632 generation, map visualization 634 generation, visualization modification, scheme 614 modification, and the like. In one instance, mapping model 612 can include one or more traditional and/or propreitary light propagation, diffusion, diffraction, reflection, refraction models. In one instance, model 612 can include, but is not limited to, a wave model, a particle model, and the like. In one embodiment, the engine 610 can be utilized to calculate a map (e.g., and/or visualization) for only light propagation within a view. In another embodiment, engine 610 can be utilized to calculate a map (e.g., and/or visualization) for light propagation and light reflection of objects within the scene 611.

Mapping model 612 can be one or more data sets for computing light propagation, diffusion, reflection, refraction, and the like. Model 612 can include, but is not limited to, a light field mapping function, a light field spatial model, and the like. In one instance, model 612 can include a two dimensional mapping function, a three dimensional mapping function, a four dimensional mapping function, and the like.

Settings 628 can be one or more options for configuring the behavior of system 600, server, and/or engine 610. In one instance, settings 628 can be persisted within a data store. In one embodiment, settings 628 can be manually and/or automatically established. In one configuration of the embodiment, settings 628 can be heuristically established from one or more historic settings and/or input. It should be appreciated that settings 628 can include one or more rules for establishing light map generation, visualization creation, visualization modification, and the like.

Scene information 613 can be one or more datasets for representing the real world scene 611 within a computing environment. Information can include, but is not limited to, atmospheric conditions, ambient light conditions, object information (e.g., object tracking information, surface materials), depth information, perspective information, and the like. In one embodiment, scene information 613 can be manually and/or automatically determined.

Light schema 614 can be one or more datasets for representing lighting conditions associated with scene 611. Lighting conditions can include, light source identifiers, light source attributes, and the like. In one instance, schema 614 can be utilized to represent light sources, light bounces (e.g., bounce card), light diffusers (e.g., scrim), and the like. In the instance, schema 614 can conform to one or more traditional and/or proprietary formats including, but not limited to, Extensible Markup Language (XML), Hypertext Markup Language (HTML), and the like. In one embodiment, schema 614 can conform to one or more traditional and/or proprietary digital lighting diagrams. In one instance, schema 614 (e.g., data from 3d modeling programs) can be imported from virtual photographic studio application (e.g., set.a.light 3D studio application), lighting simulation applications, and the like.

Light map 632 can be one or more datasets for representing light propagation from one or more light sources within scene 611 (e.g., and schema 614). Map 632 can include, but is not limited to, a light field function, a volumetric light field model, and the like. In one instance, map 632 can be a matrix data set for representing a light field from a light source within scene 611. In one embodiment, map 632 can include vector representation of a light field from a light source within scene 611. In one instance, light map 632 can correspond to light maps utilized in 3d graphics modeling, video game environments, and the like. In another instance, the light map 632 can include shadow information, viewing frustrum, and the like.

Map visualization 634 can be one or more graphical representations of light map 632. Visualization 34 can include, but is not limited to, a two dimensional geometric shape, a three dimensional volumetric region, and the like. It should be appreciated that visualization 634 appearance can be highly customized (e.g., settings 628) and is not arbitrarily limited. Visualization 634 can be arbitrarily complex and can conform to any graphics format, including but not limited to, a Joint Photographic Experts Group (JPEG), Portable Network Graphics (PNG), GIF, and the like.

Since, light map generation can be computationally intense, light map calculations can be approximated (e.g., using inverse square formula) to produce an approximately accurate light map (e.g., and/or visualization). Upon creation of an approximation, additional computation can be performed to refine the map (e.g., and/or visualization). That is, the creation of a light map and/or visualization can be a stepwise process.

It should be appreciated that engine 610 can be a component of a distributed computing network, a networked computing environment, and the like. In one instance, the engine 610 can be a functionality of an Application Programming Interface (API). In another instance, engine 610 can be a functionality of an application executing within a computing device. For example, engine 610 can be a function of a camera application of a mobile phone.

Drawings presented herein are for illustrative purposes only and should not be construed to limit the invention in any regard. It should be appreciated that engine 610 can be an optional component of system 600. It should be appreciated that one or more components within system 600 can be optional components permitting that the disclosure functionality be retained. It should be understood that engine 610 components can be optional components providing that engine 610 functionality is maintained. It should be appreciated that one or more components of engine 610 can be combined and/or separated based on functionality, usage, and the like. System 600 can conform to a Service Oriented Architecture (SOA), Representational State Transfer (REST) architecture, and the like.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for visualizing light maps comprising:
   identifying at least one light source within a real world scene, wherein the light source is associated with a plurality of attributes, wherein the light source emits light to illuminate the real world scene, wherein the attributes comprise of at least one of a light source intensity, a light source wavelength, and orientation;
   presenting a live view of the real world scene within an interface of a computing device;
   determining at least one of the plurality of attributes associated with the light source;
   computing a light map for the light source within the real world scene, wherein the light map is a graphical visualization of an approximation of a propagation of light emanating from the at least one light source within the scene;
   computing a boundary for a visualization for the light source, wherein the visualization, referred to as a light source visualization, is a visibly bounded graphic of a shape appearing as an overlay on a view of the real-world scene, wherein the graphic explicitly demarcates a bound region indicative of a bound region that is illuminated by the light source; and
   visually presenting within the interface the light source visualization for the light map, wherein the light source visualization overlays a view also presented within the interface of the real world scene.

2. The method of claim 1, further comprising:
   presenting the visualization of the light source within the interface when the at least one light source is absent from the scene or is not emitting light.

3. The method of claim 1, further comprising:
   establishing editing handles for the light source visualization, which permits a user to interactively change the bound region of the light source visualization; and
   visually presenting the light source visualization with the editing handles.

4. The method of claim 1, further comprising:
   receiving a touch screen gesture as user input to select the visualization within the interface of the computing device;

determining a user established change to the bound region and a corresponding change to an intensity of the light source; and performing the change to the light source resulting in at least one of the orientation and the intensity of the light source is modified based on the user established change.

5. The method of claim 1, wherein the computing device is at least one of a point and shoot camera and a digital SLR camera.

6. The method of claim 1, further comprising:
determining an object within the real world scene affected by the light emanating from the light source; and
automatically adjusting a view of the illumination of the object based on the propagation and diffusion of light on the object.

7. The method of claim 1, wherein the light source is at least one of a hot light and a strobe.

8. The method of claim 1, wherein the view is presented within an augmented reality computing device.

9. The method of claim 1, further comprising:
establishing a text tag for the light source visualization; and
visually presenting the tag within the interface.

10. The method of claim 1, wherein the light source is a light bulb.

11. A method for interacting with a light map comprising:
identifying at least one light source within a real world scene, wherein the light source is communicatively linked to a computing device, wherein the light source is not emitting visible light;
determining attributes of the light source to simulate light emitted from the light source based on the attributes;
computing a boundary for a visualization for the light source, wherein the visualization, referred to as a light source visualization, is a visibly bounded graphic of a shape appearing as an overlay on a view of the real-world scene, wherein the graphic explicitly demarcates a bound region indicative of a bound region that is illuminated by the light source;
graphically rendering the light source visualization, wherein the light source visualization is a graphical representation of an approximation of a propagation of light emanating from of the at least one light source; and
presenting the real world scene and the visualization within a display of the computing device, wherein the light source visualization overlays a view presented view of the real world scene.

12. The method of claim 11, wherein the attributes is at least one of an intensity, a duration, a color, and a direction.

13. The method of claim 11, further comprising:
responsive to the rendering, adjusting a view of the real world scene to approximate the presence of light from the light source associated with the visualization; and
presenting the view of the real world scene within the display of the computing device.

14. The method of claim 11, further comprising:
presenting the visualization of the light source within the interface when the at least one light source is absent from the scene or is not emitting light.

15. The method of claim 11, wherein the light source is at least one of a hot light and a strobe.

16. The method of claim 11, wherein the view is presented within an augmented reality computing device.

17. The method of claim 11, further comprising:
presenting the visualization within a home automation interface.

18. The method of claim 11, wherein the light source is a light bulb.

19. A system for interacting with a light map comprising:
a mapping engine configured to generate a light map for a light source within a real world scene, wherein the light map is a representation of an approximation of a propagation of light emanating from the at least one light source within the scene, wherein the light source is associated with a plurality of attributes, wherein the attributes comprise of at least one of a light source intensity, a light source wavelength, and orientation;
circuitry for computing a boundary for a visualization for the light map, wherein the visualization, referred to as a light source visualization, is a visibly bounded graphic of a shape appearing as an overlay on a view of the real-world scene, wherein the graphic explicitly demarcates a bound region indicative of a bound region that is illuminated by the light source;
a display for visually presenting a graphical user interface, wherein the graphical user interface is configured to visually present the light source visualization for the light map, wherein the light source visualization as presented in the graphical user interface overlays a view also presented within the interface of the real world scene; and
a data store able to persist at least one of the light map and a visualization of the light map.

20. The system of claim 19, wherein the light source is at least one of a hot light, a strobe, and a light bulb.

21. The system of claim 19, wherein the engine is a component of computing device is at least one of a point and shoot camera and a digital SLR camera.

* * * * *